United States Patent
van Buuren et al.

(10) Patent No.: US 6,841,182 B1
(45) Date of Patent: Jan. 11, 2005

(54) OLIVE OIL CONTAINING FOOD COMPOSITION

(75) Inventors: Jan van Buuren, Vlaardingen (NL); Keshab Lal Ganguli, Vlaardingen (NL); Karel P van Putte, Vlaardingen (NL)

(73) Assignee: Lipton, a division of Conopco, Inc., Englewood Cliffa, NJ (US)

( * ) Notice: Subject to any disclaimer, the term of this patent is extended or adjusted under 35 U.S.C. 154(b) by 0 days.

(21) Appl. No.: 09/211,350

(22) Filed: Dec. 15, 1998

(30) Foreign Application Priority Data

Dec. 19, 1997  (EP) .......................................... 97204048
Jan. 19, 1998  (EP) .......................................... 98200126

(51) Int. Cl.[7] .............................................. A23D 9/06
(52) U.S. Cl. .................. 426/330.6; 426/312; 426/417; 426/474; 426/601
(58) Field of Search .............................. 426/601, 417, 426/330.6, 474, 319, 312, 418, 419

(56) References Cited

U.S. PATENT DOCUMENTS

| | | | | |
|---|---|---|---|---|
| 4,789,554 A | * | 12/1988 | Scavone et al. | ............ 426/417 |
| 5,374,751 A | * | 12/1994 | Cheng et al. | ................ 554/205 |
| 5,626,756 A | * | 5/1997 | Heidlas et al. | .............. 210/634 |
| 5,962,056 A | * | 10/1999 | Melin | ....................... 426/330.6 |
| 5,998,641 A | * | 12/1999 | Ganguli et al. | .............. 554/212 |
| 6,113,971 A | * | 9/2000 | Elmaleh | ...................... 426/603 |
| 6,159,524 A | * | 12/2000 | Livingston | ................... 426/603 |
| 6,187,356 B1 | * | 2/2001 | van Buuren et al. | ......... 426/417 |

FOREIGN PATENT DOCUMENTS

| | | | |
|---|---|---|---|
| AU | 632272 | | 9/1989 |
| EP | 0304354 | | 2/1989 |
| EP | 0421504 | * | 4/1991 |
| EP | 0724874 | | 8/1996 |
| EP | 672 096 | | 5/1997 |
| EP | 0849353 | | 6/1998 |
| ES | 0718397 | * | 11/1995 |
| GB | 1511953 | | 5/1978 |
| GB | 2 244 717 A | | 11/1991 |
| GB | 0500152 | * | 8/1992 |
| GB | 2 281 304 | | 3/1995 |
| WO | 94/12596 | | 6/1994 |
| WO | 97/06697 | | 2/1997 |
| WO | 97/32947 | | 9/1997 |

OTHER PUBLICATIONS

Stecher, 1968, The Merck Index, 8th Edition, Merck & Co., Inc. Rahway, NJ, p 977.*
Hui 1996 Baileys Industrial Oil and Fat Products 5th edition, vol. 2 John Wiley & Sons, Inc New York p 241–266.*
The American Heritage Dictionary 1982 Houghton Mifflin Co p 1171.*
*Bailey's Industrial Oil and Fat Products*, vol. 1, Fourth Edition, pp. 67, and 372.
*Bailey's Industrial Oil and Fat Products*, vol. 3, p. 128.
*Chambers Twentieth Century Dictionary*.
JAOCS, Polyphenols in Olive Oils, T. Guttinger, (Nov. 1981), pp. 966–968.
*Dietary non–tocopherol antioxidants present in extra virgin olive oil increase the resistance of low density lipoproteins to oxidation in rabbits*, Atherosclerosis, 120 (1996) pp. 15–23.
International Search Report No. PCT/EP 98/07797 mailed Jun. 4, 1999.

* cited by examiner

*Primary Examiner*—Carolyn Paden
(74) *Attorney, Agent, or Firm*—Gerard J. McGowan, Jr.

(57) ABSTRACT

A method has been found for the manufacture of a spread which is characterized by the presence of a substantial amount of olive oil polyphenols and the absence of olive oil odour. The deodorized olive oil to be used for the preparation is obtained by a mild refining process which spares the olive oil's minor components.

6 Claims, No Drawings

OLIVE OIL CONTAINING FOOD COMPOSITION

The present invention deals with a fat containing food composition, particularly a spread, which contains a substantial amount of olive oil. Such composition is believed to fit in a healthy diet particularly by helping to control blood cholesterol content. The invention also comprises a process for preparation of the composition.

BACKGROUND OF THE INVENTION

The present invention deals with a food composition with a substantial fat content. Since fat consumption is associated with an increased risk of cardiovascular disorders, the nutritional value of different types of fat as well as methods for reducing the fat content of fat compositions had been the object of extensive investigations. Presently not only the triglyceride part of fats is the subject of investigations, but also the nature and the effects on health of fat attributes, the so-called minor components which are present in small amounts in non-refined natural fats. It has recently been found that the minor components which are denoted as anti-oxidants, including fat polyphenols, positively interfere with the body's cardiovascular system.

Traditionally, natural fats are refined before they are used as an ingredient for the preparation of food. However, traditional fat refining is not discriminating to the nature of the fat ingredients and aims at the removal of all substances other than triglycerides, including minor components.

Spreads are food compositions which usually contain a substantial amount of fat, often 40 wt. % or more. Usually the fat consists of a liquid oil and a structuring fat which gives the fat blend a proper consistency. Olive oil is a valuable nutritional fat because of its high content of oleic acid. Olive oil has been incorporated in food compositions either unrefined or fully refined.

In EP 421 504 spreads are described in which the fat phase consists partially of unrefined olive oil. According to GB 2281304 refined olive oil is used in the liquid oil blend of the fat phase for spread manufacture. Even when used in small amounts, the incorporation of unrefined olive oil imparts a much pronounced flavour and taste. The characteristic olive oil flavour often is appreciated, but by many people this flavour occurring in spreads is perceived as offensive and therefore is unsuitable for spreads. Hence the olive oil has to be deodorised by a refining treatment. Olive oil traditionally is deodorized at temperatures of 250° C. or even more. Under such drastic conditions also the oil's minor components, including natural anti-oxidants, particularly the typical olive oil polyphenols such as oleuropein, its aglycon (shortly aglycon), tyrosol and hydroxytyrosol, are nearly fully stripped away.

WO 97/06697 teaches that food products can be fortified with anti-oxidants, including polyphenols and particularly the water soluble tea polyphenols.

Polyphenols present in olive oil are more or less fat soluble and have a chemical composition which is different from the water soluble polyphenols. They are presumed to play in the body an anti-oxidant role in specific tissues, possibly because of their fat solubility.

When incorporating a substantial amount of olive oil polyphenols in spreads, imparting a strong olive oil odour could not be avoided up to now.

SUMMARY OF THE INVENTION

We have found an olive oil containing spread which contains a considerable amount of olive oil polyphenols but which nevertheless is free from any offensive olive oil odour. The invention makes use of a process for mild olive oil refining which allows largely retaining the polyphenols. With this process the prejudice has been overcome that proper olive oil refining requires drastic refining conditions with regard to temperature and process time. Traditional refining removes free fatty acids, resulting in a content of less than 0.1 wt. %. The found refining conditions relating to flow of sparging gas, temperature, pressure and process time are less drastic, but nevertheless are appropriate for the removal of olive oil odour and—to a large extent—of fatty acids, so that the refined olive oil is pure enough to be used for the manufacture of a spread, while the process spares a major part of the minor components, including the olive oil polyphenols, tocopherols, squalene and further unsaponifiables, including fatty alcohols and sterols, many of which are believed to be valuable nutrients. The process should be mild enough that at least 1500 ppm of squalene are retained in the olive oil.

The obtained olive oil can be used for the manufacture of spread compositions in which olive oil but not its odour is a desired ingredient. The invention therefore consists in an oil containing spread composition where 5–100 wt. % of the oil consists of olive oil and which has no perceivable olive oil odour, characterised in that the composition contains at least 10 ppm of olive oil originating polyphenols.

DETAILS OF THE INVENTION

The olive oil containing spreads of the present invention are prepared according to common spread manufacturing process technology. Examples of spread processing can be found e.g. in GB 2281304 and in EP 421 504. Generally spreads are emulsions of a water phase and a fat phase, while the fat phase ususally consists of both liquid oil and a structuring fat. According to the present invention 5–100 wt. %, preferably 5–95 wt. %, more preferably 10–95 wt. %, still more preferably 20–95 wt. % of the liquid oil of the fat phase of the emulsion consists of olive oil which has been subjected to the mild refining process of the present invention.

The invention also comprises a process for the manufacture of any food composition which contains 0.1–90 wt. % of olive oil, which process comprises selecting the usual ingredients, including an olive oil source, and employing the usual processing steps, characterised in that 10–100 wt % of the selected olive oil has been obtained according to the process of the invention. The obtained composition may exhibit an olive oil flavour when besides the mild refined olive oil obtained according to the present invention also some ingredient having an olive oil flavour is added as well. So the benefits of a relatively cheap source of refined olive oil and high levels of polyphenol and flavour are combined.

The olive oil flavour source might be e.g. a precious virgin olive oil or a proper substitute, e.g. those obtained by the methods described in WO 97/03566 and EP 852 116.

In order to retain after refining a sufficient amount of polyphenols a level of 100 ppm of polyphenols in the starting olive oil is preferred. The starting olive oil preferably is a cheap Lampante oil which usually contains substantial amounts of free fatty acids. Generally, Lampante oil contains from 20 ppm up to 250 ppm of polyphenols.

The refining process not only removes the olive oil odour but also the excess of free fatty acids. High amounts of free fatty acids, even 7 wt. % or more, are often found in Lampante grade olive oils. The mild refining process reduces the fatty acids content to less than 2 wt. %, even down to 0.3 wt. %, which is quite acceptable. Under the mild conditions of the present process the free fatty acids content can be easily reduced to less than 2 wt. %, but obviously the usual low level of 0.1 wt. % is not attained, unless the starting olive oil is already low in free fatty acids.

Polyphenols are compounds which share a phenolic hydroxyl group. Olive oil originating polyphenols are known to comprise oleuropein, aglycon, tyrosol, hydroxytyrosol and caffeic acid. Their source is olive oil and the olive fruits from which the olive oil is pressed. The total content of polyphenols in olive oils can be established by standard methods e.g. by the widely accepted calorimetric Gutfinger method as described in J. Am. Oil. Chem. Soc. 1981, 11, pp. 966–968, which method is based on the reaction of a methanolic extract of olive oil and the Folin-Ciocalteau reagent. This method has been used for establishing the polyphenol values mentioned in the present patent specification.

The olive oil is sparged with an inert gas at a temperature up to 250° C. under such conditions of sparging gas flow, pressure and process time that the refined oil is free from olive oil odour and still contains at least 1500 ppm of squalene.

Suitable refining conditions are chosen from ranges of relatively moderate sparging temperatures and pressures, particularly 120–250° C. and 2–5 mbar, respectively, using preferably 1–15 $m^3$ steam per kg of oil. At 250° C. one hour sparging has appeared to be a suitable process time, but time is prolonged to 5 hours when refining takes place at 120° C. Suitable conditions can be established easily by some trials.

Squalene is a high molecular weight ingredient, which occurs at a level of 1500–7000 ppm in crude olive oil, including unrefined Lampante oil. Olive oil when refined at traditionally high temperatures contains only little squalene, less than 1500 ppm. An olive oil which has been obtained according to the mild refining process of the present invention has retained squalene at a level of at least 1500 ppm. Experiments have shown that such concentrations can go along with a proper deodorisation. Therefore the content of native squalene has appeared to be a suitable marker for the refining depth of olive oil. A low squalene content points to a great depth of refining carried out under relatively drastic conditions. Such conditions are avoided with the process according to the present invention.

The polyphenols of olive oil are more volatile than squalene, but with the present conditions are retained for a major part in the refined oil.

Besides squalene also the above-mentioned unsaponifiables (at least 4500 ppm unsaponifiables) are retained in the mild refined olive oil.

The polyphenol containing spreads prepared according to the invention can be distinguished from known odour-free olive oil containing spreads in that they contain squalene in a concentration which is proportional to the concentration of squalene in the used mild refined olive oil. The invention comprises spreads which contain at least 5 wt. % of olive oil, but which are free from olive oil odour and contain at least 75 ppm of squalene.

Olive oils obtained according to the invention may contain e.g. 90 ppm of polyphenols when refined at 210° C., while the amount drops to 30 ppm when refined at 245° C. Process time and pressure being the same in both cases: about 1.2 hours and about 2.5 mbar. Generally spoken, when a free fatty acid content up to 1 wt. % is allowed, at least 60 wt. % of the polyphenols is retained after refining of the olive oil.

Hence, the olive oil resulting from the found process contains at least 1500 ppm of squalene and is characterized further by the absence of olive oil odour on the one side and by a relatively large amount of native polyphenols on the other side. In practice, absence of olive oil odour is decided when a sensory panel perceives no flavour difference between a composition prepared with an olive oil which has been mild refined according to the invention and a composition prepared with the same ingredients, employing the same processing, but containing an olive oil which has been fully refined in the traditional way.

Spreads obtained according to the invention can be recognized because they are characterized by a specific partition of the various types of olive oil polyphenols, which partition is caused by the mild refining conditions which have a different effect on the individual polyphenols. The partition therefore is a kind of fingerprint which reflects the applied refining conditions.

For proper stabilisation of the spreads measures have to be taken in order to prevent flavour reversion. Flavour reversion is known to occur easily when no proper attention is paid to the removal of metal ions from the olive oil, particularly of iron and copper ions which are notorious catalysts for oil degradation.

According to a preferred embodiment the refining treatment therefore includes measures which aim to reduce the concentration of said metal ions to less than 0.1 ppm. Well known procedures include e.g. the treatment of the olive oil with phosphoric acid and/or with a suitable absorbing bleaching earth, particularly under so-called wet bleaching conditions where the oil has to contain a small amount (0.2 wt. %) of water.

As said before the present mild refining treatment removes the free fatty acids only partially. Under traditional olive oil refining standards the remaining content, amounting to 0.3–2 wt. %, is not considered good enough. Fatty acids in such small amounts do not affect, however, product safety or oil taste, while product stability is hardly affected, provided metal ions have been removed.

It has appeared that the taste and stability of spreads prepared with the mild refined olive oil complies with the standards set for spreads prepared with traditionally refined olive oil.

The invention is illustrated by the following examples:

EXAMPLE 1

Olive Oil Refining

Crude olive oil (30 ton), which contained 3.2 wt. % of free fatty acids, 110 ppm of polyphenols and 3000 ppm of squalene was heated up to 90° C. and washed by thoroughly mixing with 7 wt. % of soft water of 90° C. The water phase was separated from the olive oil in a self-cleaning centrifuge. By vacuum drying at 50 mbar the olive oil became dry.

The washed and dried olive oil maintained at a temperature of 90° C. was first vigorously stirred after addition of an aqueous 50 wt. % phosphoric acid solution (0.8 l per ton of oil). After separation of the aqueous phase by centrifuging, demineralized water was added (0.6 l per ton of oil), followed by the addition of bleaching earth (VOLCANSIL DE22™, 4.5 kg per ton of oil).

After 20 min of stirring the pressure was lowered to 40 mbar and stirring was continued for another 20 min. Then the bleaching earth was removed by filtration.

The bleached olive oil was degassed at 100° C. and 30 mbar and then gradually heated up to 238° C. over one hour.

After subsequent steam sparging at 2.3 mbar, spending 9 kg of steam per ton oil, the oil was cooled down to 25° C. over one hour and finally cleared by filtration.

Analysis showed that the refined olive oil contained 0.3 wt. % of free fatty acids, 65 ppm of polyphenols and 3000 ppm of squalene. A sensory panel assessed the olive oil flavour. Using a scale with taste scores ranging from 4 (rejected) to 8 (excellent) the panel assigned to the oil a rating of 7, which is almost excellent, while olive oil flavour was hardly perceivable.

Even after 4 months of storage no taste defects were noticed.

An average olive oil after been deodorized for one hour at the normal temperature of 255° C. contains: 0.1 wt. % of free fatty acids, 1400 ppm of squalene and less than 10 ppm of polyphenols.

EXAMPLES 2–5

Olive Oil Refining

Example 1 was repeated, except that the sparging temperatures were varied as indicated in Table I while exposure times were about the same, but slightly different which explains the variations for polyphenol content.

TABLE I

| Ex. | Sparging temperature ° C. | Polyphenols content ppm | Free fatty acid content wt. % |
|---|---|---|---|
| 2 | 210 | 88 | 1.34 |
| 3 | 220 | 63 | 0.89 |
| 4 | 230 | 81 | 0.52 |
| 5 | 234 | 62 | 0.41 |

EXAMPLES 6

Spread Containing Mild Refined Olive Oil

A spread was prepared using a water phase and a fat phase having the composition as shown in Table II. The fat phase and the water phase were emulsified by vigorous stirring and pasteurized at 60° C. With a flow of 5–6 kg/h the pasteurized emulsion was conducted through

TABLE II

| | wt. % |
|---|---|
| FAT PHASE | 60 |
| fat blend[1] | 59.55 |
| Hymono 8903 ™ | 0.08 |
| Bolec ZTD ™ | 0.08 |
| beta-carotene[2] | 0.2 |
| flavour | 0.09 |
| WATER PHASE | 40 |
| skimmed milk powder | 1.2 |
| salt | 0.09 |

TABLE II-continued

| | wt. % |
|---|---|
| K-sorbate | 0.1 |
| lactic acid | until pH = 5 |
| tap water | balance up to 40 |

[1]17% of an interesterified mixture of 65 wt. parts palm oil stearin and 35 wt. parts palm kernel oil and 83% of refined olive oil (containing 1.34 wt. % of free fatty acids and 88 ppm of polyphenols).
[2]in the form of a 0.4 wt. % beta-carotene solution in sunflower seed oil a Lab Votator ™ line A-A-C. Processing conditons for A1: 800 rpm, exit 20–22° C., A2: 800 rpm, exit 6° C. and C (50 ml): 250 rpm.

The obtained spread was judged on aspects including flavour, colour, taste, taste stability, spreadability, consistence and stability of consistence. The spread exhibited excellent quality in all aspects.

A comparison spread was prepared under identical conditions and with the same ingredients, except that an olive oil was chosen, qualified as pure olive oil, which was obtained by traditional refining at a relatively high temperature. However, a sensory panel could perceive a taste difference between both spreads, neither immediately after preparation, nor after 5 weeks of storage.

We claim:

1. A process for refining an olive oil which process comprises sparging the oil with an inert gas at a temperature of up to 250° C. under such conditions of sparging gas flow, pressure and process time that the refined oil is free from olive oil odour and contains at least 1500 ppm squalene, the refining conditions being such that at least 60 wt % of the polyphenols present in the source oil are retained.

2. A process according to claim 1 where the olive oil to be refined, the source oil, contains at least 100 ppm of polyphenols.

3. A process according to claim 1 where the sparging temperature is 120–250° C.

4. A process according to claim 1 where the sparing pressure is 2–5 mbar.

5. A process for the manufacture of a food composition which contains 0.1–90 wt. % of olive oil, comprising the steps of
   1. selecting the ingredients usual for the composition, including an olive oil source, and
   2. employing the processing steps usual for obtaining the composition,
   where 10–100 wt % of the selected olive oil has been obtained according to claim 1.

6. A process for refining an olive oil which process comprises sparging the oil with an inert gas at a temperature of up to 250° C. under such conditions of sparging gas flow, pressure and process time that the refined oil is free from olive oil odour and contains at least 1500 ppm squalene, the olive oil to be refined, the source oil, containing at least 100 ppm polyphenols.

* * * * *